United States Patent
Shin et al.

(10) Patent No.: US 8,041,180 B2
(45) Date of Patent: Oct. 18, 2011

(54) HARDWARE APPARATUS AND METHOD HAVING VIDEO/AUDIO ENCODING AND MULTIPLEXING FUNCTIONALITY

(75) Inventors: Jae-Seob Shin, Seoul (KR); Yeon-Bae Kim, Seoul (KR); Se-Hoon Son, Seoul (KR); Hyeong-Duck Kim, Seoul (KR); Hwan-Serk Choi, Seoul (KR)

(73) Assignee: Pixtree Inc., Seoul (KR)

( * ) Notice: Subject to any disclaimer, the term of this patent is extended or adjusted under 35 U.S.C. 154(b) by 1006 days.

(21) Appl. No.: 11/914,540

(22) PCT Filed: May 23, 2006

(86) PCT No.: PCT/KR2006/001935
§ 371 (c)(1),
(2), (4) Date: Nov. 15, 2007

(87) PCT Pub. No.: WO2006/126826
PCT Pub. Date: Nov. 30, 2006

(65) Prior Publication Data
US 2008/0175558 A1   Jul. 24, 2008

(30) Foreign Application Priority Data
May 24, 2005   (KR) ........................ 10-2005-0043479

(51) Int. Cl.
*H04N 5/932* (2006.01)
*H04N 5/935* (2006.01)
(52) U.S. Cl. .......................................... 386/201; 386/66
(58) Field of Classification Search .................... 386/66, 386/201
See application file for complete search history.

(56) References Cited

U.S. PATENT DOCUMENTS

| | | | |
|---|---|---|---|
| 4,794,465 A * | 12/1988 | Van Luyt et al. | 386/241 |
| 4,855,730 A * | 8/1989 | Venners et al. | 340/4.37 |
| 4,901,151 A * | 2/1990 | Mehrgardt et al. | 348/725 |
| 4,937,672 A * | 6/1990 | Anderson | 348/554 |
| 4,963,995 A * | 10/1990 | Lang | 386/285 |
| 5,119,082 A * | 6/1992 | Lumelsky et al. | 345/600 |
| 5,430,485 A | 7/1995 | Lankford et al. | |

(Continued)

FOREIGN PATENT DOCUMENTS

JP    2002-353922 A    12/2002
(Continued)

*Primary Examiner* — Farid Homayounmehr
(74) *Attorney, Agent, or Firm* — The Nath Law Group; Derek Richmond; Stanley N. Protigal (57) ABSTRACT

The apparatus includes a video signal acquisition device, an audio signal acquisition device, a time information processing device, a video signal encoding device, an audio signal encoding device, a multiplexing device and an output device. The video signal acquisition device receives the video signals and converts them into digital video data. The audio signal acquisition device receives the audio signals and converts them into digital audio data. The time information processing device receives a clock signal for synchronization of the digital video and audio data. The video signal encoding device encodes the digital video data. The audio signal encoding device encodes the audio video data. The multiplexing device converts the encoded video and audio signals into a single piece of bit stream data. The output device outputs the bit stream data. The time information processing device provides the two pieces of time information respectively as a video reference clock and an audio reference clock. The video reference clock and the audio reference clock are multiplexed into the bit stream data as capture time points.

20 Claims, 4 Drawing Sheets

U.S. PATENT DOCUMENTS

| | | | |
|---|---|---|---|
| 5,488,481 A * | 1/1996 | Okada et al. | 386/201 |
| 5,521,927 A * | 5/1996 | Kim et al. | 370/474 |
| 5,555,097 A * | 9/1996 | Joung et al. | 386/201 |
| 5,557,663 A * | 9/1996 | Huang et al. | 379/110.01 |
| 5,596,364 A * | 1/1997 | Wolf et al. | 348/192 |
| 5,640,197 A * | 6/1997 | Benenti et al. | 348/14.1 |
| 5,715,356 A * | 2/1998 | Hirayama et al. | 386/239 |
| 6,020,901 A * | 2/2000 | Lavelle et al. | 345/545 |
| 6,151,442 A * | 11/2000 | Ueno et al. | 386/327 |
| 6,236,884 B1 * | 5/2001 | Hunter et al. | 600/544 |
| 6,633,613 B1 * | 10/2003 | Houlberg | 375/240.26 |
| 6,697,569 B1 * | 2/2004 | Gomez et al. | 386/201 |
| 6,741,290 B1 * | 5/2004 | Wells | 348/512 |
| 7,030,930 B2 * | 4/2006 | Kovacevic | 348/515 |
| 2003/0156827 A1 * | 8/2003 | Janevski | 386/96 |
| 2004/0047608 A1 * | 3/2004 | Takayama et al. | 386/96 |
| 2004/0103446 A1 | 5/2004 | Yagi et al. | |
| 2008/0145023 A1 * | 6/2008 | Candelore et al. | 386/84 |
| 2008/0297652 A1 * | 12/2008 | Buttle et al. | 348/441 |
| 2010/0046640 A1 * | 2/2010 | Shin et al. | 375/240.29 |
| 2010/0238349 A1 * | 9/2010 | Kimura | 348/540 |
| 2010/0253840 A1 * | 10/2010 | Nave | 348/500 |
| 2011/0032364 A1 * | 2/2011 | Sheng | 348/184 |
| 2011/0115981 A1 * | 5/2011 | Matsumoto | 348/624 |

FOREIGN PATENT DOCUMENTS

| | | |
|---|---|---|
| JP | 2004-173118 A | 6/2004 |
| KR | 10-2003-0082117 A | 10/2003 |
| KR | 10-2003-0044233 A | 1/2005 |
| KR | 10-2005-0076968 A | 7/2005 |
| KR | 10-0638138 B1 | 10/2006 |

* cited by examiner

HARDWARE APPARATUS AND METHOD HAVING VIDEO/AUDIO ENCODING AND MULTIPLEXING FUNCTIONALITY

CROSS-REFERENCES TO RELATED APPLICATIONS

This is a U.S. National Stage under 35 U.S.C. §371 of International Application PCT/KR2006/001935 filed May 23, 2006, claiming the benefit of priority of Republic of Korea application KR 10-2005-0043479 filed May 24, 2005, which was registered as Republic of Korea Patent Reg. No. 10-0638138 B1 on Oct. 18, 2006.

TECHNICAL FIELD

The present invention relates to a system and method for compressing digital video signals and digital audio signals and, more particularly, to a system for processing video signals/audio signals in which the video signals are synchronized with the audio signals, regardless of the performance of the system, and a related method.

BACKGROUND ART

Generally, the term "Moving Picture Experts Group (MPEG)" refers to a standard technology for moving pictures, and is a method in which a transmitter compresses and transmits moving pictures and a receiver decodes and reproduces them.

The operation of MPEG is briefly described below. First, an encoding and transmitting side digitizes given video and audio signals, compresses two types of signals through an encoding step of compressing them with minimized loss, multiplexes the two types of signals into a single bit stream, and outputs it.

The data converted into the bit stream as described above may be stored in a medium, or be transmitted via a wired or wireless connection and transferred to a receiving side. The receiving side, which reproduces it, performs the reverse process of separating signals using a multiplexer, decoding the signals through a decoder and reproducing the signals on the multiplexed bit stream data.

One of the important technologies in the above-described procedure is that the video signals and the audio signals, which are simultaneously generated and acquired and are then converted into a bit stream, are reproduced by the receiving side in a state in which the video and audio signals are closely synchronized with each other. In this case, the synchronization between the video and audio signals means that the picture and sound are synchronized at the time of being reproduced.

A conventional method for the synchronization of digital video signals and digital audio signals which has been used until now is a method of recording time information (a Decoding Time Stamp; hereinafter referred to as a DTS) which must be decoded in respective video data and audio data and/or time information (a Presentation Time stamp; hereinafter referred to as a PTS) which must be reproduced in a header of unit data (hereinafter, a data unit in which time information can be recorded is referred to as a "frame"), multiplexing the time information and, thus, learning reproduction time and performing reproduction based on the time information at the time of reproduction.

The method of recording the time information is described in detail below. When encoding is completed on a frame basis, a time point at which the encoding of one frame begins or a time point at which encoding is completed is measured and set for a reference time (hereinafter referred to as a 'reference clock'), a DTS or PTS is acquired through calculation assuming that the same frame rate is applied based on the reference clock, the DST or PTS is recorded at the time of multiplexing, and then conversion into a bit stream is performed. In the case of MPEG 4, a Composition Time Stamp (CTS) functions as the PTS.

However, the conventional synchronization method still has several problems in spite of its various accurate constructions.

Of the problems, the biggest one is that synchronization is still not perfect. One significant reason why a problem is caused in the synchronization itself is that the rate at which the Central Processing Unit (CPU) of an encoding device processes frames is not uniform because a low performance input device or a low performance reproduction device is used. If the reference clock is captured as the time of the encoding step when encoding is performed in low performance hardware, the DTS or PTS provided through calculation based on the reference clock is calculated according to a uniform criterion on the assumption that the performance of the encoding device ensures a uniform frame rate. However, a low performance encoding device cannot process data at a uniform frame rate due to the load on itself. That is, the actual DTS or PTS is different from the calculated DTS or CTS. Accordingly, if an erroneous PTS or CTS is used when video signals and audio signals are not uniformly processed, a synchronization problem occurs.

In another case, a phenomenon in which some of the video signals and audio signals of a bit stream to be reproduced are omitted occurs. In this case, some data are not reproduced at the time of reproduction, so that a phenomenon in which audio data is not synchronized with video data, that is, pictures do not match sounds, occurs.

Recently, with the development of technology, the amount of data to be transmitted and processed has dramatically increased, so that synchronization has gradually become an issue. Furthermore, as digital broadcasting has been provided in practice, unsynchronized reproduction in digital broadcasting is inconvenient to customers and, at the same time, has a bad effect on the reputation of a data transmitter.

As a result, an improved data processing method and system capable of decreasing poorly synchronized reproduction are strongly required.

SUMMARY

Accordingly, the present invention has been made keeping in mind the above problems occurring in the prior art, and an object of the present invention is to provide an apparatus and method for processing data such that video data and audio data are perfectly synchronized with each other.

Another object of the present invention is to provide a hardware structure and method for processing respective signals using separate processors so as to rapidly process video data and audio data.

A further object of the present invention is to provide a hardware structure and method for more perfectly synchronizing and multiplexing both video signals and audio signals even though separate processors process video signals and audio signals.

In order to accomplish the above objects, the present invention provides a video/audio data processing apparatus for respectively receiving video signals and audio signals from a video signal input device and an audio signal input device, and encoding and outputting them as a bit stream, including a video signal acquisition device for receiving the video signals from the video signal input device and converting them into frame-based digital video data; an audio signal acquisition device for receiving the audio signals from the audio signal input device and converting them into frame-based digital audio data; a time information processing device for receiving a clock signal for synchronization of the frame-based digital video data and the frame-based digital audio data; a video signal encoding device for encoding the frame-based digital video data; an audio signal encoding device for encoding the frame-based audio video data; a multiplexing device for converting the encoded video and audio signals provided by the video signal encoding device and the audio signal encoding device into a single piece of bit stream data; and an output device for outputting the bit stream data provided by the multiplexing device; wherein the time information processing device acquires time information about when the video signals are input from the video signal input device to the video signal acquisition device and time information about when the audio signals are input from the audio signal input device to the audio signal acquisition device, and provides the two pieces of time information to the multiplexing device respectively as a video reference clock and an audio reference clock; and wherein, when converting the encoded video and audio signals into the single piece of bit stream data, the multiplexing device multiplexes the video reference clock and the audio reference clock into the bit stream data as capture time points for the encoded video and audio signals.

Furthermore, in the video/audio data processing apparatus, the video signal acquisition device and the audio signal acquisition device are respectively formed of separate programmable logic devices, and the time information processing device, the video signal encoding device, the audio signal encoding device, and the multiplexing device are respectively formed of separate processors. In more detail, the programmable logic devices may be formed of Field Programmable Gate Arrays (FPGAs), and the processors may be formed of Digital Signal Processors (DSPs).

The present invention relates to a hardware apparatus for processing video/audio data, and, more particularly, to an apparatus that encodes audio and video signals using separate hardware devices and converts them into a bit stream.

Using the present invention, there are advantages in that a large amount of data can be rapidly processed and, at the same time, better synchronization is achieved.

In particular, although there have been conventional attempts to rapidly process data by processing video and audio signals using separate processors, the attempts have not been realized due to the preconception in which the video and audio signals must be processed using a single processor to avoid the synchronization problem. Accordingly, the present invention has inventiveness.

Those skilled in the art who understand the technical spirit of the present invention can variously and easily modify the embodiments of the present invention. Accordingly, the present invention is not limited only to the above-described embodiments, and the scope of the present invention must be defined based on the following claims.

DETAILED DESCRIPTION

Preferred embodiments of the present invention are described in detail below with reference to the accompanying drawings.

Figure 1:
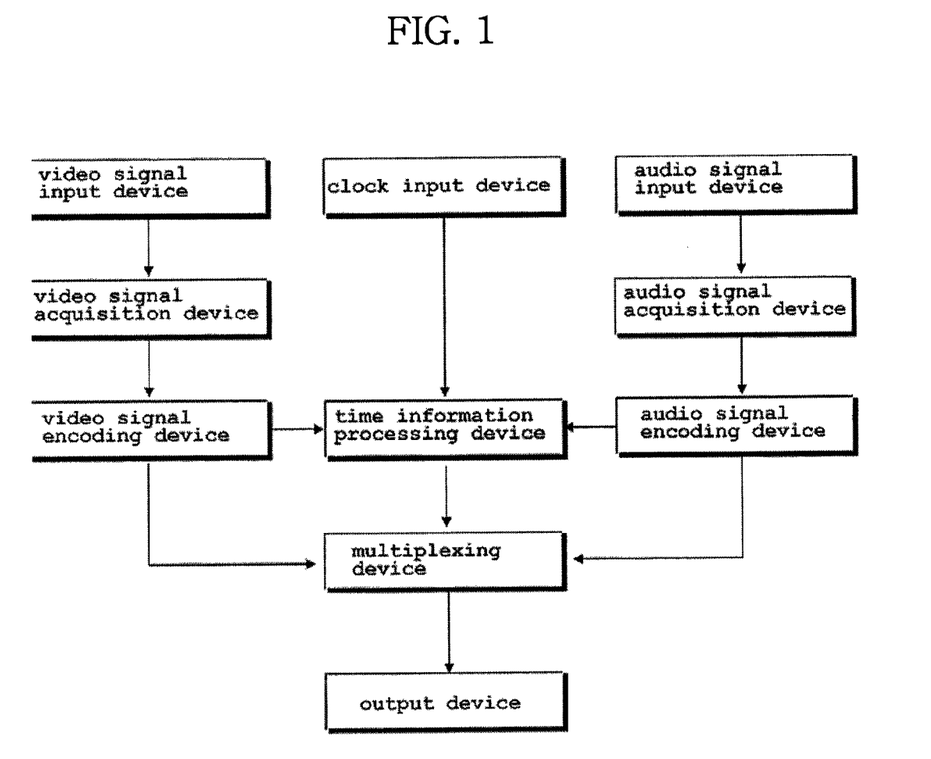
FIG. 1 is a block diagram illustrating the fundamental hardware construction of the present invention.

FIG. 1 is a block diagram illustrating an embodiment of an apparatus for processing video/audio signals according to the present invention. The construction of FIG. 1 and the operating process thereof are described in detail. First, video signals to be multiplexed are provided from a video signal input device to a video signal acquisition device for converting the video signals into frame-based digital video data. Audio signals to be synchronized with the video signals are also input to an audio signal input device and are then provided to an audio signal acquisition device for converting the audio signals into frame-based digital audio data.

The term "video signals" is a concept that includes both analog and digital signals, and the term audio signals is the same. In this case, when analog signals, which are continuous with respect to a time axis are input, an audio signal sampling clock generator may be connected to the audio signal input device and sample and provide the audio signals before the analog signals are converted into digital data.

The video signals are input to the video signal acquisition device and are then converted into a necessary format. In the present invention, the step of the video signals being input to the video signal acquisition device for the conversion is referred to as an acquisition step or acquisition.

The concrete form of the acquisition step is described using video signals as an example. If input video signals are analog signals, the acquisition step are mainly divided into two steps of converting the analog signals into digital signals using an Analog-to-Digital (A/D) converter and converting the digital signals into a frame-based digital data format which can be recognized by the encoding device of the present invention. If the input video signals are digital signals, the conversion of a format is only conducted at the acquisition step.

In the present invention, a frame, as described above, refers to a digital data unit, for example, an Access Unit (AU) that requires time information at the time of reproduction. Although the data unit is called a frame or an AU in MPEG, it may be called other terms in other specifications or other communication methods. As a result, the frame of the present invention is to be broadly understood as a basic data unit or a data packet that requires time information at the time of encoding or decoding.

In this case, the start time of the step of acquiring video signals is a time point at which at least one frame of video signals starts to be input to a video signal acquisition device, and the completion time of the acquisition step is a time point at which all of the data of at least one video frame has undergone a conversion step required by the video signal acquisition device and has been converted into a format at a step prior to the step of encoding.

That is, in the present invention, the completion of acquisition of video signals means that all of the digital data of one video frame has been converted into a format at a step prior to the step of encoding. Hereinafter, video signals existing immediately before being input to an encoding device through the video signal acquisition device are called digital video signals.

Audio signals are processed the same as the video signals described above. That is, sampled audio signals are converted into digital signals by an audio signal acquisition device and are then converted into a format for encoding. Furthermore, a time point at which the signals for one audio frame composed of a plurality of sampled signals are input to an acquisition device is the start time of the acquisition, and a time point at which the conversion into a format at the step prior to the step of encoding has been completed for a frame unit is the completion time of the acquisition. Hereinafter, such audio data is referred to as digital audio data.

In FIG. 1, a time information processing device is a device for receiving external clock signals. In this case, the external clock signals refer to pulse-type time information. The external clock signals have a concept including clock signals provided from within a system, and may be time clocks provided in common to the entire broadcasting station when the present invention is applied to broadcasting equipment. The clock signals are used as clock signals for the subsequent synchronization of the frame-based digital video data and the frame-based digital audio data.

Meanwhile, when video signals are input to the video signal acquisition device, the video signal acquisition device notifies the time information processing device of the input of the video signals, and the time information processing device acquires a clock at that moment and uses the clock as a video reference clock at the time of multiplexing the frame-based video data. The method of operating the time information processing device and the process of capturing a reference clock will be described later.

The video signals, having been converted into frame-based digital video data by the video signal acquisition device, undergo various pre-processing steps, such as noise elimination using a Phase Locked Loop (PLL), color space transformation, the adjustment of color sub-sampling or screen size ratio, or the like, if necessary, and are then input to a video encoder which performs an encoding process.

In the present invention, the encoding process is based on a general encoding concept, and includes transformation processes such as Differential Pulse Code Modulation (DPCM) or Discrete Cosine Transform (DCT), quantization, and entropy encoding. Encoding specifications are standard specifications designated by, for example, MPEG, and utilizes video compression-encoding technology such as ISO/IEC 13818-2, ISO/IEC 14496-2, or ISO/IEC 14496-10, which is a video standard.

Like the video signals, when audio signals are input into an audio signal acquisition device, the audio signal acquisition device notifies the time information processing device of the input of the audio signals. The time information processing device acquires a clock at the moment, and uses the acquired clock as a reference clock at the time of performing the synchronization of related audio data. The processing method is similar to that of the video signals. The digital audio data is encoded by an audio encoder separately from the video signals and is then provided to a multiplexing device.

As described above, digital video signals and digital audio signals are combined into a single bit stream while undergoing a multiplexing process, with their own reference clocks being respectively included in the digital video signals and the digital audio signals. One of a packet-based transport (TS) multiplexing method and a program stream (PS) multiplexing method is generally used in the case of MPEG 2, but a structure type multiplexing method may also be used in a stable situation in which transmission interruption seldom occurs.

The encoded bit stream may undergo error-resilient encoding which additionally provides a parity bit for the prevention of errors, and convolution encoding which performs encryption.

The bit stream, having undergone the above-described multiplexing and post-processing, is modulated using a digital modulation method, which is suitable for transmission paths, and is then output to a bit stream output device. The bit stream may be output in a wireless signal form through broadcasting equipment, may be output to a receiver in a wired signal form, or may be output in a Compact Disk (CD) or Digital Video Disk (DVD) form, so that the present invention is not limited to a specific output form. The bit stream, having been transmitted to a terminal via a wired/wireless connection, is reproduced through a decoding process.

The present invention is characterized in that video signals and audio signals are processed using separate processors and the multiplexing thereof is performed using separate processors. Accordingly, there is an advantage in that load due to the processing of a large volume of data is very effectively shared, thereby enabling rapid processing.

However, the separate processors must separate and process audio data and video data, which are generated at the same time, so that there is a high probability of causing a significant synchronization problem. Therefore, in order to resolve the problem, the present invention has a specific construction for the time information processing device, the operating method and capturing of a reference clock of which are described in detail below.

When the time information processing device detects the time when the video signals are input to the video acquisition device while receiving time information from a clock input device, the time information processing device measures time information at that time, and provides it to the encoder as a video reference clock. Hereinafter, the operation of the time information processing device is called 'time capturing' or 'time information acquisition'.

The situation in which the video signals are input to the video acquisition device is described in detail below with reference to FIG. 2. At the time (time point a) when the video signals reach the conversion means of the video acquisition device, the conversion means of the video acquisition device, having detected this, notifies the time information processing device of it. In a specific example, when the conversion means of the video acquisition device alters a flag bit provided in a register connected to the time information processing device, the control terminal of the time information processing device, continuously monitoring the flag bit, detects the input of the video signals based on the alteration of the flag bit, acquires a clock signal input at that moment, that is, a relative time, through a time acquisition means, and provides it to the multiplexing device as the video reference clock of corresponding video signals.

For audio signals, an audio clock signal is captured in the same method. That is, at the time that the video signals reach the conversion means of the video acquisition device, the conversion means of the video acquisition device, having detected this, notifies the time information processing device of it, and the time information processing device captures a clock at that moment.

The reference clock may be multiplexed into the bit stream as a reproduction time, that is, a Presentation Time Stamp (PTS) or a Composition Time Stamp (CTS), when the video and audio signals are multiplexed by the multiplexing device, or may be used as the basis for calculating a Decoding Time Stamp (DTS).

It is possible for the time information processing device to be provided with any type of time information as long as it can be used in common for the respective deices mentioned in the present invention.

The above-described technical characteristics of the present invention are effective for the synchronization of data at the time of reproduction. The process thereof is briefly described below. The receiver or the terminal receives and demodulates a transmitted bit stream, and the demodulated bit stream undergoes an error correction step and a decoding step and is recovered to the audio signals and video signals.

The recovered audio signals and video signals are respectively reproduced in frame units. In this case, the reproduction time is set to the reference clock. Meanwhile, the reference clock is not related to the performance of hardware which has been used for subsequent encoding because the reference clock is the time of starting to be input to respective acquisition devices at the time of encoding.

As a result, video signals and audio signals encoded according to the present invention are reproduced in perfect synchronization with each other.

The above-described embodiment may have various modifications.

Figure 2:
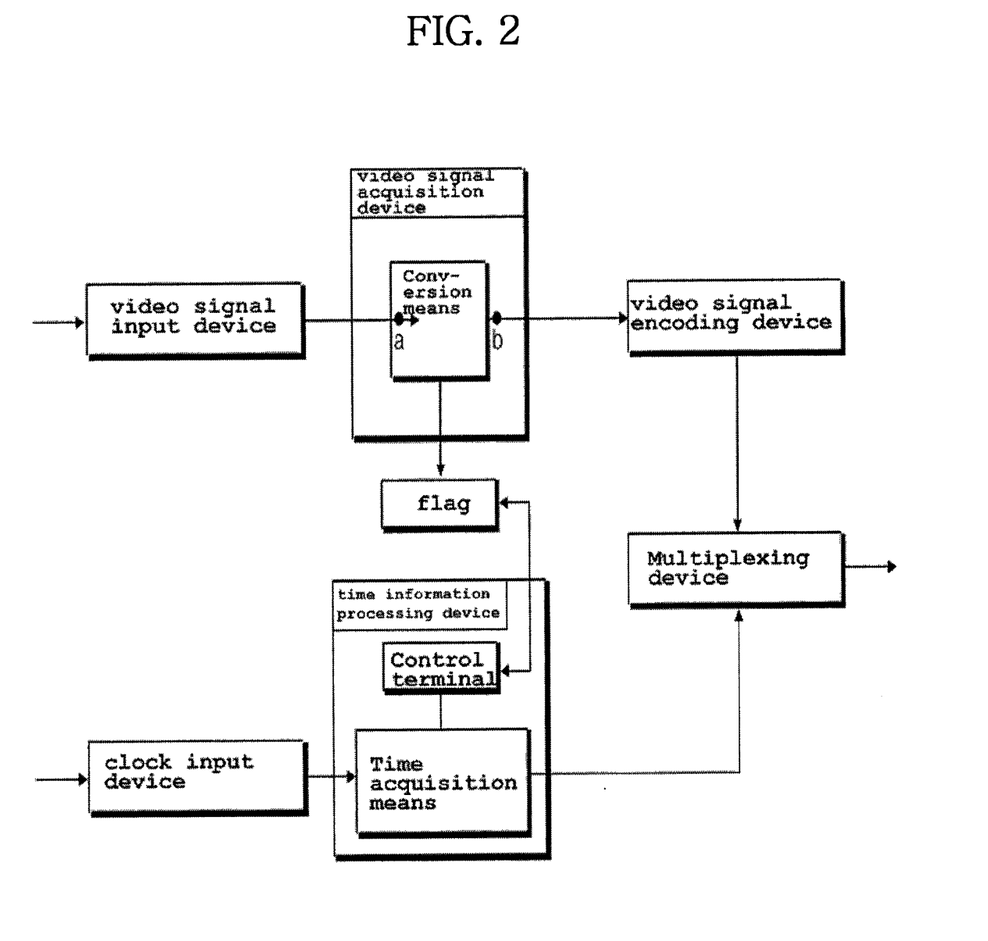
FIG. 2 is a block diagram illustrating a construction for capturing a video reference clock.

In FIG. 2, a reference clock may be captured on the basis of time point b instead of time point a. In detail, time point b refers to an output point of the acquisition device, that is, a point immediately before the video and audio signals of one frame are input to the encoding device after the completion of digitization and format conversion. The reference clock captured at this moment can be used as a reference clock to be used for synchronization of video and audio signals unless the performance of data conversion in the acquisition device is significantly degraded.

In all of the embodiments mentioned in the present invention, clocks captured at time points other than time points a and b are not used. The reason for this is that dependency on the performance of hardware for encoding is too large to use clocks, which are captured at time points other than time points a and b, as reference clocks for synchronization. Therefore, time points other than time points a and b are excluded because synchronization performance is degraded.

Furthermore, from the point of view of data, time point b means the output point of the acquisition device, but the output point of the acquisition device and the input point of the encoding device are technically the same in the case where data is directly input from the acquisition device to the encoding device without additional data processing. Therefore, in that case, the time point b is a concept that includes the input point of the encoding device.

Furthermore, in the present invention, the time point at which data is input to the audio or video signal acquisition device refers to any one of time points a and b.

Another embodiment of the present invention relates to a method in which the video or audio signal acquisition device directly notifies the time information processing device of data input, thereby capturing a reference clock, without using the flag.

In detail, first, when the video or audio signal acquisition device is ready to output acquired data, that is, notification of readiness for transmission of acquired data is provided to the control terminal of an encoding unit, the encoding unit performs setting such that digital video data and digital audio data to be output from the respective acquisition devices are moved to the predetermined area of memory through Direct Memory Access (DMA). Along with the setting, the control terminal of the encoding unit calls an interrupt service process and causes the time information processing device to acquire the reference clock.

In still another method, when the video or audio signal acquisition device notifies the encoding unit of readiness for data output, the encoding unit moves data from the acquisition device to a predetermined area of memory after DMA setting, and then calls the interrupt service process and causes the time information processing device to acquire the reference clock.

In still another method, the video or audio signal acquisition device transmits a command by indicating a direct capture command in a predetermined register of the time information processing unit at the time point at which the time information processing device must capture a reference clock, and the time information processing device may recognize the command using an interrupt method or a polling method of periodically checking the register, and then capture a reference clock.

The respective components of the present invention are basically formed of independent hardware devices. Embodiments of the hardware construction of the present invention are described in detail below.

First, components except for components having conventional hardware constructions, such as the video signal input device or the audio signal input device, are mostly implemented using software modules in a PC.

The reason why software constructions have been mainly used in the prior art, besides the reduction in cost, is that synchronization is not guaranteed if respective units have independent hardware constructions. That is, when the video or audio signal acquisition devices are respectively controlled by separate processors, the respective processors have different processing speeds due to the different performances and load thereof, so that a uniform frame rate of the audio signals and the video signals is not guaranteed, and, therefore, a DTS or a PTS is not precisely calculated for synchronization.

In the present invention, the time point prior to the encoding device is used as a reference clock so as to be independent of the frame processing speeds of respective processors, thereby resolving the above-described problem. As a result, there are two advantages in that the video signals and the audio signals are processed by separate processors to improve the processing speeds and more precise synchronization is possible than in the prior art.

Figure 3:
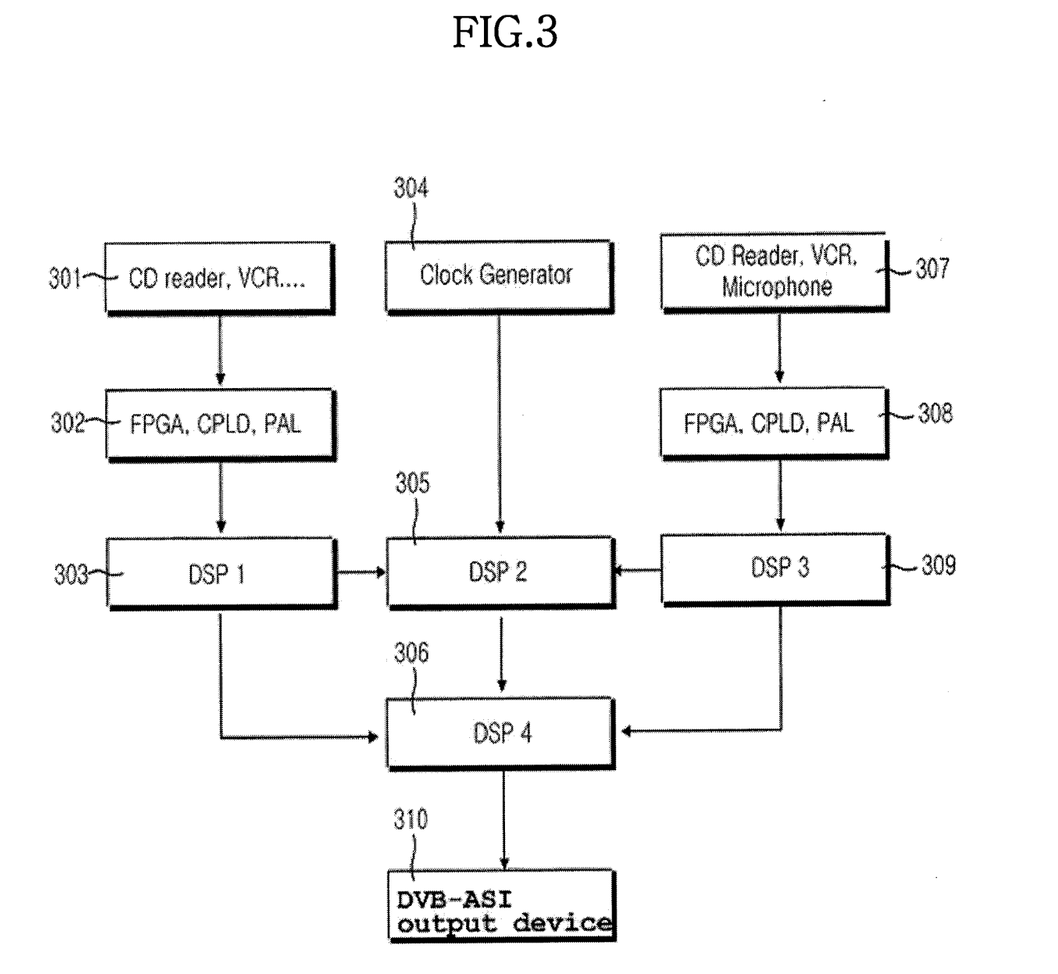
FIG. 3 is a block diagram illustrating the modified hardware construction of the present invention.

An example of the specific hardware construction of the present invention is illustrated in FIG. 3. The construction of FIG. 3 is basically identical to that of FIG. 1. FIG. 3 is different from FIG. 1 in that specific hardware is described for each device in FIG. 3.

In FIG. 3, a video signal input device 301 and an audio signal input device 307 are implemented using a general CD or DVD reader, a VCR capturing device, or a microphone. A video signal acquisition device 302 and an audio signal acquisition device 308 are formed of programmable logic gates to which various modifications can be applied if necessary, examples of which are a Field Programmable Gate Array (FPGA), a Complex Programmable Logic Device (CPLD), and a Programmable Array Logic (PAL). In the present invention, programming is performed to notify the time information processing device of data input using the logic circuits when data is input to the acquisition device, besides format conversion. That is, the video signal acquisition device 302 and the audio signal acquisition device 308 of the present invention mainly perform a process of converting input video or audio signals into a data format which can be processed by an encoding unit. The process may include data acquisition, resolution transformation and pre-filtering.

Furthermore, in order for the time information processing device to acquire a reference clock at a precise moment, a method of placing a flag register in the above-described logic circuit, or a flag register in another control unit or the time information processing device and setting a flag bit may be employed.

As another method of reporting a precise time of capturing a reference clock to the time information processing device, the above-described method of performing interrupts, or a method of performing polling may be used.

Unlike the prior art, in the encoding device, the video signal encoding device 303 and the audio signal encoding device 309 are respectively implemented using separate Digital Signal Processors (DSPs). As a result, the video signals and the audio signals are respectively encoded by the separate devices, so that the processing speed thereof is considerably improved compared to the prior art, and, at the same time, there is no effect on synchronization.

A time information processing device 305 and a multiplexing device 306 are also implemented using separate DSPs. In this construction, Application Specific Integrated Circuit (ASIC) chips may be used instead of the DSPs. Furthermore, the above-described types of processors are in common called "operation drivers".

An output device is implemented using hardware construction, for example, a DVB-ASI or ETI/STI device, like that of the prior art.

In this construction, a switching device, such as MUX, a RS-232 device, a key-panel input device, and a real-time output device such as a monitor, are omitted, and an error resilient coding device or a convolutional coding device is also omitted. Since they have general construction, they may be also used in the present invention. Detailed descriptions thereof are omitted because those skilled in the art could easily implement them.

Figure 4:
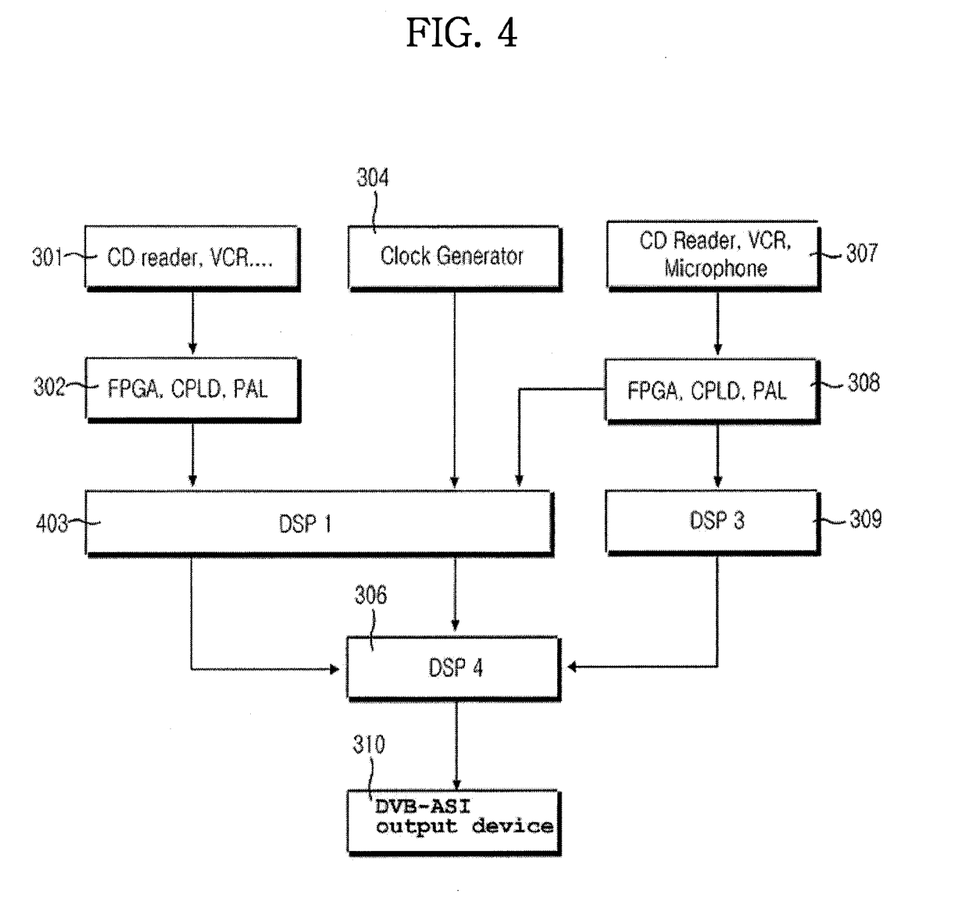
FIG. 4 is a block diagram illustrating another modified hardware construction of the present invention.

FIG. 4 illustrates another embodiment of the hardware apparatus of the present invention, and devices identical to those of FIG. 3 are designated using the same reference numerals. In FIG. 4, the most characteristic feature is that the function of a conventional time information processing device is incorporated into a DSP1 403, which is a video signal encoding device. Since the load of the process performed by the time information processing device is relatively light, the time information processing device can be implemented in a single processor, along with the video signal encoding device and the audio signal encoding device.

In the case where the video signal encoding device and the time information processing device are implemented using a single device, the operating method thereof is described below. When the video signals of one frame start to be input to the video signal acquisition device, or are output after the completion of frame-based conversion, the processor of the video signal acquisition device notifies the processor of the video signal encoding device of this, in substitute for the processor of the time information processing device. When detecting the notification, the processor of the video signal encoding device causes the time information processing device existing therein in a software form to acquire time information about that moment and use the time information as the video reference clock.

Meanwhile, when the audio signals of one frame start to be input to the audio signal acquisition device or are output after the completion of frame-based conversion, the processor of the audio signal acquisition device alters a flag coupled to the processor of the video signal encoding device. When detecting the alteration, the processor of the video signal encoding device causes the time information processing device to acquire time information about that moment and use it as the audio reference clock.

In another modification of FIG. 4, the time information processing device is included in the processor of the audio signal encoding device. In this case, at the moment at which the audio signals are input to the audio signal acquisition device and then data of one frame start to be input or have been acquired, the processor of the audio signal acquisition device alters a first flag coupled to the processor of the audio signal encoding device. When detecting the alteration of the first flag, the processor of the audio signal encoding device causes the time information processing device to acquire time information abut that moment and use it as the audio reference clock.

At the moment at which the video signals are input to the video signal acquisition device and then data of one frame start to be input or have been acquired, the processor of the video signal acquisition device alters a second flag coupled to the processor of the audio signal encoding device. When detecting the alteration of the second flag, the processor of the audio signal encoding device causes the time information processing device to acquire time information about that moment and use it as the video reference clock.

The present invention can be used for hardware devices for processing video/audio data.

The invention claimed is:

1. A video/audio data processing apparatus for respectively receiving video signals and audio signals from a video signal input device and an audio signal input device, and encoding and outputting them as a bit stream, comprising:
   a video signal acquisition device for receiving the video signals from the video signal input device and converting them into frame-based digital video data;
   an audio signal acquisition device for receiving the audio signals from the audio signal input device and converting them into frame-based digital audio data;
   a time information processing device for receiving a clock signal for synchronization of the frame-based digital video data and the frame-based digital audio data;
   a video signal encoding device for encoding the frame-based digital video data;
   an audio signal encoding device for encoding the frame-based audio video data;
   a multiplexing device for converting the encoded video and audio signals provided by the video signal encoding device and the audio signal encoding device into a single piece of bit stream data; and
   an output device for outputting the bit stream data provided by the multiplexing device;
   wherein the time information processing device acquires time information about when the video signals are input from the video signal input device to the video signal acquisition device and time information about when the audio signals are input from the audio signal input device to the audio signal acquisition device, and provides the two pieces of time information to the multiplexing device respectively as a video reference clock and an audio reference clock,
   wherein the video reference clock is time information about a moment at which the video signals have finished being converted into a format existing prior to encoding by the video signal acquisition device, and the audio reference clock is time information about a moment at which the audio signals have finished being converted into a format existing prior to encoding by the audio signal acquisition device; and
   wherein, when the multiplexing device converts the encoded video and audio signals into the single piece of bit stream data, the multiplexing device multiplexes the video reference clock and the audio reference clock into the bit stream data as capture time points for the encoded video and audio signals.

2. The video/audio data processing apparatus as set forth in claim 1, wherein:
when the video signals are input to the video signal acquisition device, an operation driver of the video signal acquisition device notifies the time information processing device of the input, and when the notification is received, the time information processing device acquires time information about a moment of reception and uses the information as the video reference clock; and
when the audio signals are input to the audio signal acquisition device, an operation driver of the audio signal acquisition device notifies the time information processing device of the input, and when the notification is received, the time information processing device acquires time information about a moment of reception and uses the information as the audio reference clock.

3. The video/audio data processing apparatus as set forth in claim 1, wherein:
when the video signals are input to the video signal acquisition device, an operation driver of the video signal acquisition device alters a first flag coupled to the time information processing device, and when the alteration of the first flag is detected, the time information processing device acquires time information about a moment of the alteration and uses it as the video reference clock; and
when the audio signals are input to the audio signal acquisition device, an operation driver of the audio signal acquisition device alters a second flag coupled to the time information processing device, and when the alteration of the second flag is detected, the time information processing device acquires time information about a moment of the alteration and uses it as the audio reference clock.

4. The video/audio data processing apparatus as set forth in claim 1, wherein the capture time point is used as a Presentation Time Stamp (PTS) for the video and audio signals.

5. The video/audio data processing apparatus as set forth in claim 1, wherein the capture time point is used as a Composition Time Stamp (CTS) for the video and audio signals.

6. The video/audio data processing apparatus as set forth in claim 1, wherein the capture time point is used as a Decoding Time Stamp (DTS) for the video and audio signals.

7. The video/audio data processing apparatus as set forth in claim 1, wherein:
the video signal acquisition device, the video signal encoding device, the audio signal acquisition device, the audio signal encoding device, the multiplexing device and the time information processing device are constructed using pieces of hardware respectively having separate processors;
at a moment at which the video signals start to be input to the video signal acquisition device, the processor of the video signal acquisition device alters a first flag coupled to the processor of the time information processing device, and when the alteration of the first flag is detected, the processor of time information processing device acquires time information about a moment of the alteration and uses it as the video reference clock; and
at a moment at which the audio signals start to be input to the audio signal acquisition device, the processor of the audio signal acquisition device alters a second flag coupled to the processor of the time information processing device, and when the alteration of the second flag is detected, the processor of the time information processing device acquires time information about a moment of the alteration and uses it as the audio reference clock.

8. The video/audio data processing apparatus as set forth in claim 1, wherein:
the video signal acquisition device, the video signal encoding device, the audio signal acquisition device, the audio signal encoding device, the multiplexing device and the time information processing device are constructed using pieces of hardware respectively having separate processors;
at a moment at which the video signals of one frame start to be input to the video signal acquisition device, the processor of the video signal acquisition device alters a first flag coupled to the processor of the time information processing device, and when the alteration of the first flag is detected, the processor of the time information processing device acquires time information about a moment of the alteration and uses it as the video reference clock; and
at a moment at which the audio signals of one frame start to be input to the audio signal acquisition device, the processor of the audio signal acquisition device alters a second flag coupled to the processor of the time information processing device, and when the alteration of the second flag is detected, the processor of the time information processing device acquires time information about a moment of the alteration and uses it as the audio reference clock.

9. The video/audio data processing apparatus as set forth in claim 1, wherein:
the video signal acquisition device, the video signal encoding device, the audio signal acquisition device, the audio signal encoding device, and the multiplexing device are constructed using pieces of hardware respectively having separate processors, and the time information processing device is controlled by a hardware processor of the video signal encoding device;
at a moment at which the video signals of one frame start to be input to the video signal acquisition device, the processor of the video signal acquisition device alters a first flag coupled to the processor of the video signal encoding device, and when the alteration of the first flag is detected, the processor of the video signal encoding device causes the time information processing device to acquire time information about a moment of the alteration and use it as the video reference clock; and
at a moment at which the audio signals of one frame start to be input to the audio signal acquisition device, the processor of the audio signal acquisition device alters a second flag coupled to the processor of the video signal encoding device, and when the alteration of the second flag is detected, the processor of the video signal encoding device causes the time information processing device to acquire time information about a moment of the alteration and to use it as the audio reference clock.

10. The video/audio data processing apparatus as set forth in claim 1, wherein:
the video signal acquisition device, the video signal encoding device, the audio signal acquisition device, the audio signal encoding device, and the multiplexing device are constructed using pieces of hardware respectively having separate processors, and the time information processing device is controlled by a hardware processor of the video signal encoding device;

at a moment at which the video signals have been input to the video signal acquisition device and then data of one frame has been acquired, the processor of the video signal acquisition device alters a first flag coupled to the processor of the video signal encoding device, and when the alteration of the first flag is detected, the processor of the video signal encoding device causes the time information processing device to acquire time information about a moment of the alteration and use it as the video reference clock; and at a moment at which the audio signals have been input to the audio signal acquisition device and then data of one frame has been acquired, the processor of the audio signal acquisition device alters a second flag coupled to the processor of the video signal encoding device, and when the alteration of the second flag is detected, the processor of the video signal encoding device causes the time information processing device to acquire time information about a moment of the alteration and to use it as the audio reference clock.

11. The video/audio data processing apparatus as set forth in claim 1, wherein:

the video signal acquisition device, the video signal encoding device, the audio signal acquisition device, the audio signal encoding device, and the multiplexing device are constructed using pieces of hardware respectively having separate processors, and the time information processing device is controlled by a hardware processor of the audio signal encoding device;

at a moment at which the audio signals of one frame start to be input to the audio signal acquisition device, the processor of the audio signal acquisition device alters a first flag coupled to the processor of the video signal encoding device, and when the alteration of the first flag is detected, the processor of the audio signal encoding device causes the time information processing device to acquires time information about a moment of the alteration and to use it as the audio reference clock; and at a moment at which the video signals of one frame start to be input to the video signal acquisition device, the processor of the video signal acquisition device alters a second flag coupled to the processor of the audio signal encoding device, and when the alteration of the second flag is detected, the processor of the audio signal encoding device causes the time information processing device to acquire time information about a moment of the alteration and to use it as the video reference clock.

12. The video/audio data processing apparatus as set forth in claim 1, wherein:

the video signal acquisition device, the video signal encoding device, the audio signal acquisition device, the audio signal encoding device, and the multiplexing device are constructed using pieces of hardware respectively having separate processors, and the time information processing device is controlled by a hardware processor of the audio signal encoding device;

at a moment at which the audio signals have been input to the audio signal acquisition device and then data of one frame has been acquired, the processor of the audio signal acquisition device alters a first flag coupled to the processor of the audio signal encoding device, and when the alteration of the first flag is detected, the processor of the audio signal encoding device causes the time information processing device to acquire time information about a moment of the alteration and use it as the audio reference clock; and at a moment at which the video signals have been input to the video signal acquisition device and then data of one frame has been acquired, the processor of the video signal acquisition device alters a second flag coupled to the processor of the audio signal encoding device, and when the alteration of the second flag is detected, the processor of the audio signal encoding device causes the time information processing device to acquire time information about a moment of the alteration and use it as the video reference clock.

13. The video/audio data processing apparatus as set forth in claim 1, wherein at least one of an error-resilient encoding device and a convolutional encoding device is included between the multiplexing device and the output device, and the bit stream data, which is output from the multiplexing device, additionally undergoes one of error-resilient encoding and convolutional encoding, and is then transmitted to the output device.

14. The video/audio data processing apparatus as set forth in any one of claims 1 to 13, wherein:

the video signal encoding device, the audio signal encoding device and the multiplexing device respectively comprise separate Digital Signal Processors (DSPs); and the audio signal acquisition device and the video signal acquisition device respectively comprise programmable logic components.

15. The video/audio data processing apparatus as set forth in claim 14, wherein each of the programmable logic components is one of a Field Programmable Gate Array (FPGA), a Complex Programmable Logic Device (CPLD), and a Programmable Array Logic (PAL).

16. A video/audio data processing apparatus for respectively receiving video signals and audio signals from a video signal input device and an audio signal input device, and encoding and outputting them as a bit stream, comprising:

a video signal acquisition device comprising a first programmable logic component, receiving the video signals from the video signal input device, and converting them into frame-based digital video data;

an audio signal acquisition device comprising a second programmable logic component, receiving the audio signals from the audio signal input device, and converting them into frame-based digital audio data;

a time information processing device comprising a first processor and receiving a clock signal for synchronization of the frame-based digital video data and the frame-based digital audio data;

a video signal encoding device comprising a second processor and encoding the frame-based digital video data;

an audio signal encoding device comprising a third processor and encoding the frame-based audio video data;

a multiplexing device comprising a fourth processor and converting the encoded video and audio signals, which are provided by the video signal encoding device and the audio signal encoding device, into a single piece of bit stream data, wherein the video signals have finished being converted into a format existing prior to encoding by the video signal acquisition device, and the audio signals have finished being converted into a format existing prior to encoding by the audio signal acquisition device; and an output device outputting the bit stream data provided by the multiplexing device.

17. The video/audio data processing apparatus as set forth in claim 16, wherein the first and second programmable logic gate components are Field Programmable Gate Arrays (FPGAs) and the first to fourth processors are DSPs.

18. A method of operating a video/audio data processing apparatus for respectively receiving video signals and audio signals from a video signal input device and an audio signal input device and compressing and outputting them, comprising the steps of:
 a video signal acquisition device receiving the video signals from the video signal input device and converting them into frame-based digital video data;
 an audio signal acquisition device receiving the audio signals from the audio signal input device and converting them into frame-based digital audio data;
 a time information processing device acquiring time information about when the video signals are input from the video input device to the video signal acquisition device as a video reference clock and time information about when the audio data is input from the audio signal input device to the audio signal acquisition device as an audio reference clock,
 wherein the video reference clock is time information about a moment at which the video signals have finished being converted into a format existing prior to encoding by the video signal acquisition device, and the audio reference clock is time information about a moment at which the audio signals have finished being converted into a format existing prior to encoding by the audio signal acquisition device;
 a video signal encoding device receiving the frame-based digital video data from the video signal acquisition device and encoding it;
 an audio signal encoding device receiving the frame-based digital audio data from the audio signal acquisition device and encoding it;
 the video signal encoding device and the audio signal encoding device respectively providing the encoded video and audio signals to a multiplexing device;
 the time information processing device providing the video reference clock and the audio reference clock to the multiplexing device;
 a multiplexing device multiplexing the video reference clock and the audio reference clock into a single piece of bit stream data as capture time points for the encoded video and audio signals when converting the encoded video and audio signals, which are provided by the video signal encoding device and the audio signal encoding device, into a single piece of bit stream data; and
 an output device outputting the bit stream data provided by the multiplexing device.

19. The method as set forth in claim 18, wherein:
 the video signal acquisition device, the video signal encoding device, the audio signal acquisition device, the audio signal encoding device and the multiplexing device are constructed using pieces of hardware respectively having separate processors;
 when the video signals are provided to the video signal acquisition device and an operation driver of the video signal acquisition device notifies the time information processing device of the input of the video signals, the time information processing device acquires time information about a moment of the notification and uses the information as the video reference clock; and
 when the audio signals are input to the audio signal acquisition device and an operation driver of the audio signal acquisition device notifies the time information processing device of the input of the audio signals, the time information processing device acquires time information about a moment of the notification and uses the information as the audio reference clock.

20. The method as set forth in claim 19, wherein the notification of the signal input to the time information processing device by the operation driver of the video signal acquisition device and the operation driver of the audio signal acquisition device is achieved by altering a flag coupled to the time information processing device.

* * * * *